United States Patent
Buley et al.

(10) Patent No.: US 9,616,806 B2
(45) Date of Patent: Apr. 11, 2017

(54) CROSSING BAR SYSTEM

(71) Applicant: Gloria M. Buley, Shokan, NY (US)

(72) Inventors: Gloria M. Buley, Shokan, NY (US);
Wesley S. Buley, Shokan, NY (US);
Travis C. Buley, Shokan, NY (US)

(73) Assignee: WOODSTOCK TRANSPORTATION COMPONENTS, INC., Scarsdale, NY (US)

( * ) Notice: Subject to any disclaimer, the term of this patent is extended or adjusted under 35 U.S.C. 154(b) by 143 days.

(21) Appl. No.: 14/562,894

(22) Filed: Dec. 8, 2014

(65) Prior Publication Data

US 2015/0158419 A1 Jun. 11, 2015

Related U.S. Application Data

(60) Provisional application No. 61/913,692, filed on Dec. 9, 2013.

(51) Int. Cl.
*B60Q 1/50* (2006.01)
*B60Q 1/26* (2006.01)
*B60R 1/10* (2006.01)
*B60R 19/48* (2006.01)

(52) U.S. Cl.
CPC .......... *B60Q 1/2657* (2013.01); *B60Q 1/2661* (2013.01); *B60Q 1/2692* (2013.01); *B60R 1/10* (2013.01); *B60R 19/48* (2013.01)

(58) Field of Classification Search
CPC ...... B60Q 1/50; B60R 21/34; B60R 2021/346

USPC ......... 116/28 R; 340/433, 471, 472
See application file for complete search history.

(56) References Cited

U.S. PATENT DOCUMENTS

| | | | | |
|---|---|---|---|---|
| 3,153,398 A | * | 10/1964 | Runkle et al. ............. | B60J 9/02 116/28 R |
| 4,323,320 A | * | 4/1982 | Liebrich et al. ........ | B08B 17/04 40/582 |
| 5,132,662 A | * | 7/1992 | Burch ....................... | B60Q 1/50 180/271 |
| 5,199,754 A | * | 4/1993 | Freeman ................. | B60R 21/34 116/28 R |
| 5,226,686 A | * | 7/1993 | Triggs et al. ............ | B60Q 1/50 116/280 |
| 5,355,117 A | * | 10/1994 | Jefferson .................. | B60Q 1/48 16/280 |

(Continued)

*Primary Examiner* — R. A. Smith
(74) *Attorney, Agent, or Firm* — McAndrews, Held & Malloy, Ltd.

(57) ABSTRACT

Certain embodiments provide a crossing bar system. The crossing bar system may include a rotatable drive shaft, a motor, a triangular crossing bar tube, and a vehicle body bar restraint. The motor is coupleable to an end of a vehicle and is operable to rotate the rotatable drive shaft. The triangular crossing bar tube is coupled to and extends substantially horizontally from the rotatable drive shaft. The triangular crossing bar tube may include lighting. The vehicle body bar restraint is coupleable to the end of the vehicle. The triangular crossing bar tube is deployable between a retracted position where the triangular crossing bar tube is substantially parallel to the end of the vehicle and may be received within the restraint, and a deployed position where the triangular crossing bar tube is substantially perpendicular to the end of the vehicle.

20 Claims, 3 Drawing Sheets

(56) References Cited

U.S. PATENT DOCUMENTS

| | | | | |
|---|---|---|---|---|
| 5,406,251 A * | 4/1995 | Leis | ............... | B60Q 1/50 |
| | | | | 116/39 |
| 5,467,071 A * | 11/1995 | Koenig | ............ | B60Q 1/50 |
| | | | | 340/433 |
| 5,564,359 A * | 10/1996 | Harder | ............ | B60R 21/34 |
| | | | | 116/28 R |
| 5,635,902 A * | 6/1997 | Hochstein | ........ | B60Q 1/50 |
| | | | | 340/332 |
| 5,860,385 A * | 1/1999 | Lamparter | ......... | B60R 21/34 |
| | | | | 116/28 R |
| 6,099,203 A * | 8/2000 | Landes | ............ | E01F 9/629 |
| | | | | 116/63 R |
| 6,213,526 B1 * | 4/2001 | Swanger et al. | ..... | B60R 19/48 |
| | | | | 116/28 R |
| 6,254,151 B1 * | 7/2001 | Lamparter | ......... | B60R 19/48 |
| | | | | 116/28 R |
| 6,477,978 B2 * | 11/2002 | Lamparter | ......... | B60R 21/34 |
| | | | | 116/28 R |
| 6,778,072 B2 * | 8/2004 | Phillips et al. | ...... | B60Q 1/50 |
| | | | | 180/271 |
| 6,951,184 B2 * | 10/2005 | Haigh et al. | ....... | B60R 21/34 |
| | | | | 116/28 R |
| 7,370,602 B2 * | 5/2008 | Greves | ............ | B60Q 7/005 |
| | | | | 116/28 R |
| 8,763,484 B2 * | 7/2014 | Yinko, Jr. et al. | ... | B60Q 1/2657 |
| | | | | 340/433 |
| 2005/0018291 A1 * | 1/2005 | Rigney | ............ | B60R 1/06 |
| | | | | 359/507 |

* cited by examiner

CROSSING BAR SYSTEM

CROSS-REFERENCE TO RELATED APPLICATIONS/INCORPORATION BY REFERENCE

The present application claims priority under 35 U.S.C. §119(e) to provisional application Ser. No. 61/913,692 filed on Dec. 9, 2013, entitled "Crossing Bar System." The above referenced provisional application is hereby incorporated herein by reference in its entirety.

U.S. application Ser. No. 13/269,287 filed on Oct. 7, 2011 and entitled "Breakaway Drive System" is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention relates to crossing bar systems. More specifically, the present invention provides a crossing bar system that includes a triangular crossing bar tube that illuminates an area generally below and/or around the crossing bar when in a deployed position and that is secured generally flush with a front end of a bus by a restraint when in a retracted position. The crossing bar system may be employed by school buses and other vehicles to reduce fatalities among school-aged children and to reduce the incidents of accidents involving children, adults, cars, and the like.

BACKGROUND OF THE INVENTION

A crossing bar is a safety device intended to protect children from being struck while crossing in front of a school bus. Conventional school bus crossing arms are wire or plastic devices that rotatably extend from a front bumper on a passenger side of a bus while it is stopped for loading/unloading to form a barrier that prevents children from walking directly in front of the bus. The purpose of the device is that children needing to cross the road are encouraged to walk several feet forward of the front of the bus before beginning to cross the road, ensuring that the bus driver can see the children as they cross in front of the bus, avoiding a blind spot immediately in front of the bus. The crossing arm retracts flush against the bumper while not activated, such as when the bus is in motion and/or the passenger door is closed.

Existing crossing bar systems include a rectangular crossing bar. The rectangular crossing bar can collect debris, ice, and snow, for example, the additional weight causing the support brackets to weaken and the bar to sag over time. Many conventional crossing bar system do not include mechanisms for securing the crossing bar against the bumper when the crossing bar system is not activated and the bar is in a retracted/closed position. Other crossing bar systems may include a magnetic closure system that can be rendered ineffective when debris, ice, and snow, for example, build up on the crossing bar and/or the bumper of the bus. When used at night, it may be difficult for a bus driver to see the area below and around an extended crossing bar because the headlights of the bus are typically positioned above the crossing bar system.

Further limitations and disadvantages of conventional and traditional approaches will become apparent to one of skill in the art, through comparison of such systems with some aspects of the present invention as set forth in the remainder of the present application.

SUMMARY OF THE INVENTION

Certain embodiments of the present technology provide a crossing bar system, substantially as shown in and/or described in connection with at least one of the figures.

These and other advantages, aspects and novel features of the present invention, as well as details of an illustrated embodiment thereof, will be more fully understood from the following description and drawings.

BRIEF DESCRIPTION OF THE DRAWING(S)

DETAILED DESCRIPTION OF PREFERRED EMBODIMENT(S)

Figure 1:
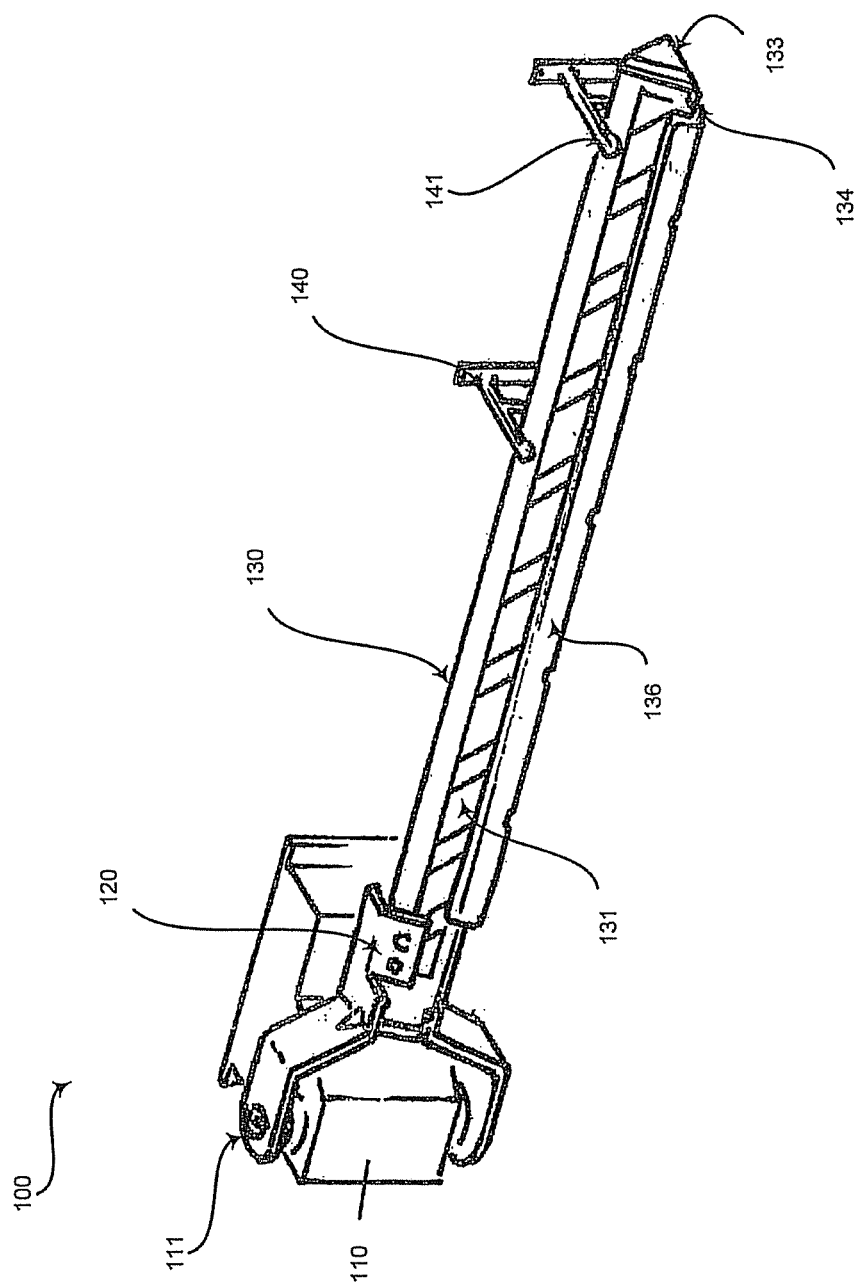
FIG. 1 depicts a front perspective view of an exemplary crossing bar system in a closed position used in accordance with embodiments of the present technology.

Embodiments of the present technology provide a crossing bar system. The crossing bar may be a triangular crossing bar tube that illuminates an area below and/or around the crossing bar when in a deployed position and that is secured generally flush with a front end of a bus by a restraint when in a retracted position.

The foregoing summary, as well as the following detailed description of certain embodiments will be better understood when read in conjunction with the appended drawings. It should be understood that the various embodiments are not limited to the arrangements and instrumentality shown in the drawings. It should also be understood that the embodiments may be combined, or that other embodiments may be utilized and that structural changes, unless so claimed, may be made without departing from the scope of the various embodiments of the present invention. The following detailed description is, therefore, not to be taken in a limiting sense, and the scope of the present invention is defined by the appended claims and their equivalents.

As used herein, an element or step recited in the singular and proceeded with the word "a" or "an" should be understood as not excluding plural of said elements or steps, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Figure 2:
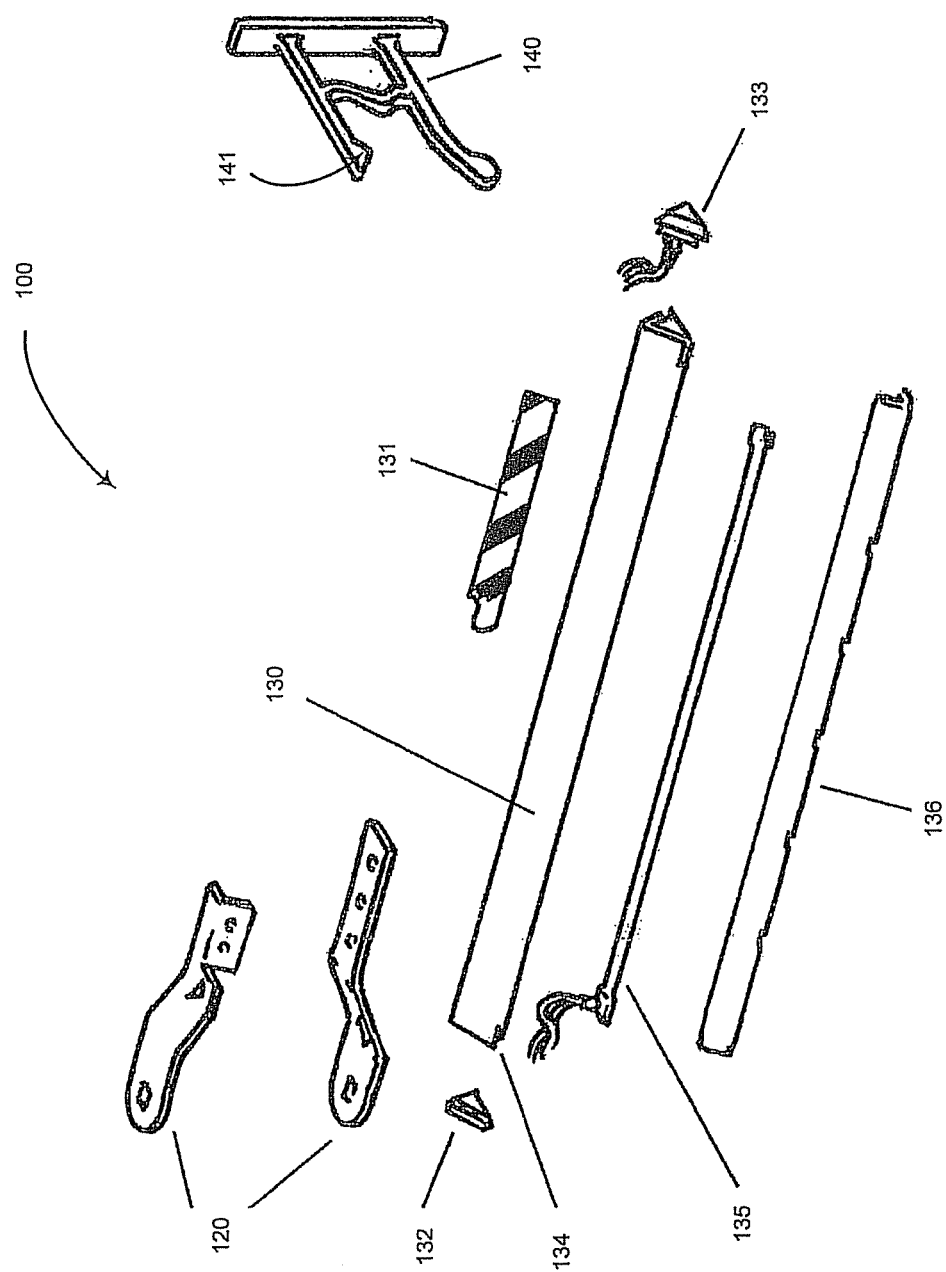
FIG. 2 depicts an exploded view of an exemplary crossing bar system used in accordance with embodiments of the present technology.
Figure 3:
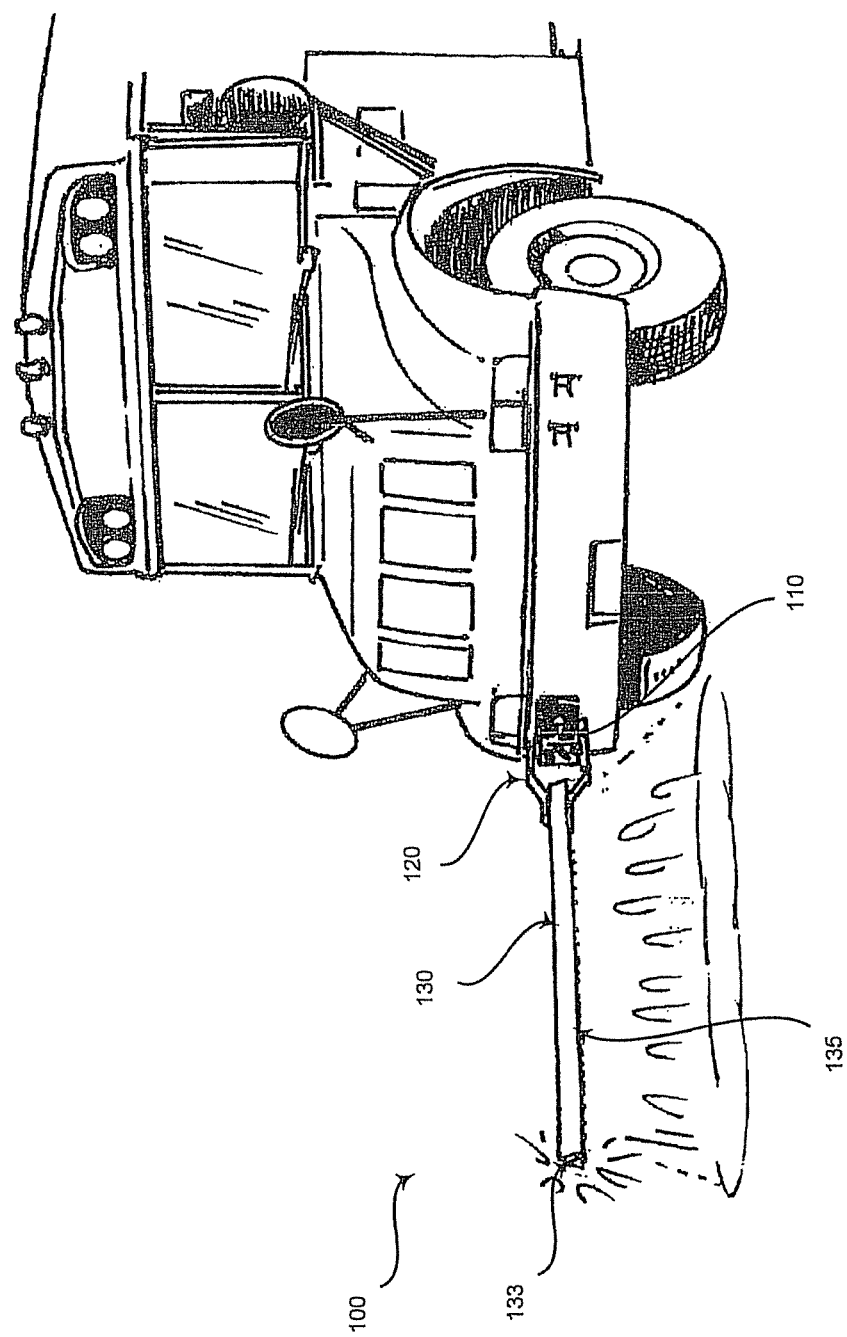
FIG. 3 depicts a front perspective view of an exemplary illuminated crossing bar system attached to a bus and in an open position with activated lights used in accordance with embodiments of the present technology.

FIG. 1 depicts a front perspective view of an exemplary crossing bar system 100 in a closed position used in accordance with embodiments of the present technology. FIG. 2 depicts an exploded view of an exemplary crossing bar system 100 used in accordance with embodiments of the present technology. FIG. 3 depicts a front perspective view of an exemplary illuminated crossing bar system 100 attached to a bus and in an open position with activated lights 133, 135 used in accordance with embodiments of the present technology. Referring to FIGS. 1-3, various embodiments provide a crossing bar system 100. The crossing bar system 100 comprises a motor box 110, support brackets 120, crossing bar 130, and vehicle body bar restraint 140.

The motor box 110 comprises a motor operable to rotate a drive shaft 111. In various embodiments, the motor box 110 may share various characteristics with the breakaway drive system described in U.S. application Ser. No. 13/269,287 filed on Oct. 7, 2011 and entitled "Breakaway Drive System," which is hereby incorporated herein by reference in its entirety. The motor box 110 can be affixed to a front passenger side of a vehicle, such as a school bus, for example, and may be activated by a driver of the vehicle. For example, the motor of the motor box 110 can be activated when a driver triggers a school bus passenger door opening mechanism, among other things. The motor may be operable to rotate the drive shaft 111 substantially ninety (90) degrees in a first direction in response to a deploy trigger (e.g., open the school bus passenger door) and substantially ninety (90) degrees in a second direction that is opposite the first direction in response to a retract trigger (e.g., close the school bus passenger door), for example.

The crossing bar 130 may comprise retro-reflective tape 131, end caps 132, 133, weep holes 134, lighting 135, and a bumper 136. In a representative embodiment, the crossing bar 130 can be a triangular, hollow tube that is generally eight (8) to ten (10) feet long. The crossing bar 130 may be acrylonitrile butadiene styrene (ABS), or any suitable material. The crossing bar 130 can be coupled to the drive shaft 111 of the motor box 110 by support brackets 120. The crossing bar 130 may be rotated substantially horizontally to a deployed position substantially perpendicular to the front end of the vehicle by the motor rotating the drive shaft 111 substantially ninety (90) degrees in a first direction in response to a deploy trigger and may be rotated to a retracted position substantially parallel to the front end of the vehicle by the motor rotating the drive shaft 111 substantially ninety (90) degrees in a second direction that is opposite the first direction in response to a retract trigger, for example.

The retro-reflective tape 131 can be attached to a front and/or rear surface of the crossing bar 130 and/or to the bumper 136 to provide increased visibility of the crossing bar 130. In embodiments where the crossing bar 130 is a hollow tube, end caps 132, 133 may be provided on one or both ends of the crossing bar 130 to inhibit water or debris from entering the crossing bar 130 and may protect passerby from sharp end edges of the crossing bar 130. In certain embodiments, one or both of the end caps 133 can be illuminated, such as with light emitting diode(s), for providing increased visibility of the crossing bar 130. The end cap 133 can illuminate in response to the deploy trigger and turn off in response to the retract trigger, for example. In embodiments where the crossing bar 130 is a hollow tube, weep holes 134 can provide a water outlet for condensation that may build up inside the crossing bar 130.

The lighting 135 may be attached to a bottom, front, and/or rear surfaces of the crossing bar 130 to provide increased visibility of an area generally below and/or around the crossing bar 130. The lighting 135 can illuminate in response to the deploy trigger and turn off in response to the retract trigger, for example. The lighting 135 may be a weatherproof light emitting diode strip or any suitable lighting mechanism, for example. The bumper 136 can be a safety mechanism attached to a front surface and/or partially wrap around the crossing bar 130 to protect passerby and/or nearby vehicles or other items from injury or damage. The bumper 136 may be rubber or any suitable material.

The vehicle body bar restraint 140 may be attached to a front end of a vehicle and is operable to receive and secure the crossing bar 130 when the crossing bar 130 is in a retracted position. In various embodiments, the vehicle body bar restraint 140 can be a bracket comprising a protrusion 141 for securing the crossing bar 130 in the retracted position. The motor of the crossing bar system 100 is operable to rotate the crossing bar 130 with a force sufficient to slide beyond the protrusion 141 such that the crossing bar 130 is received in the bracket 140 when rotating from a deployed position to a retracted position and the crossing bar 130 is moved out of the bracket 140 when rotating from a retracted position to a deployed position.

In a representative embodiment, a crossing bar system 100 is provided. The crossing bar system 100 comprises a rotatable drive shaft 111, a motor 110, a triangular crossing bar tube 130, and a restraint 140. The motor 110 is coupleable to an end of a vehicle and is operable to rotate the rotatable drive shaft 111. The triangular crossing bar tube 130 is coupled to and extends substantially horizontally from the rotatable drive shaft 111. The triangular crossing bar tube 130 includes lighting 133, 135. The restraint 140 is coupleable to the end of the vehicle. The triangular crossing bar tube 130 is deployable between a retracted position where the triangular crossing bar tube 130 is substantially parallel to the end of the vehicle and is received within the restraint 140, and a deployed position where the triangular crossing bar tube 130 is substantially perpendicular to the end of the vehicle.

While particular elements, embodiments and applications of the present invention have been shown and described, it will be understood that the invention is not limited thereto since modifications can be made by those skilled in the art without departing from the scope of the present disclosure, particularly in light of the foregoing teachings.

What is claimed is:

1. A crossing bar system comprising:
   a rotatable drive shaft;
   a motor coupleable to an end of a vehicle and operable to rotate the rotatable drive shaft;
   a triangular crossing bar tube coupled to and extending horizontally from the rotatable drive shaft, the triangular crossing bar tube deployable between a retracted position wherein the triangular crossing bar tube is substantially parallel to the end of the vehicle, and a deployed position wherein the triangular crossing bar tube is substantially perpendicular to the end of the vehicle.

2. The crossing bar system according to claim 1, wherein the triangular crossing bar tube comprises lighting.

3. The crossing bar system according to claim 2, wherein the triangular crossing bar tube comprises a bottom surface, a front surface, and a rear surface, and wherein the lighting is a weatherproof light emitting diode strip attached to one or more of the bottom surface, the front surface, and the rear surface of the triangular crossing bar tube.

4. The crossing bar system according to claim 2, wherein the lighting is activated when in the deployed position and de-activated when in the retracted position.

5. The crossing bar system according to claim 2, wherein the lighting is configured to illuminate at least an area below the triangular crossing bar tube.

6. The crossing bar system according to claim 1, comprising a restraint coupleable to the end of the vehicle, wherein the triangular crossing bar tube is received within the restraint when in the retracted position.

7. The crossing bar system according to claim 6, wherein the restraint comprises a protrusion operable to secure the triangular crossing bar tube in the retracted position, and wherein the motor is operable to deploy and retract the triangular crossing bar tube with a force sufficient to slide beyond the protrusion.

8. The crossing bar system according to claim 1, comprising at least one support bracket operable to secure the triangular crossing bar tube to the rotatable drive shaft.

9. The crossing bar system according to claim 1, wherein the triangular crossing bar tube comprises a first end and a second end, and wherein at least one of the first end and the second end comprises an end cap.

10. The crossing bar system according to claim 9, wherein the end cap comprises end cap lighting.

11. The crossing bar system according to claim 10, wherein the end cap lighting comprises at least one light emitting diode.

12. The crossing bar system according to claim 10, wherein the end cap lighting is activated when in the deployed position and de-activated when in the retracted position.

13. The crossing bar system according to claim 1, wherein the triangular crossing bar tube is hollow and comprises weep holes providing a water outlet.

14. The crossing bar system according to claim 1, wherein the triangular crossing bar tube comprises a bottom surface, a front surface, and a rear surface, and wherein at least the front surface comprises a retro-reflective tape.

15. The crossing bar system according to claim 1, wherein the triangular crossing bar tube comprises a bottom surface, a front surface, and a rear surface, and wherein a bumper is attached to one or more of the bottom surface, the front surface, and the rear surface.

16. The crossing bar system according to claim 1, wherein the triangular crossing bar tube is acrylonitrile butadiene styrene (ABS).

17. The crossing bar system according to claim 1, wherein the triangular crossing bar tube is eight (8) to ten (10) feet long.

18. A crossing bar system comprising:
a rotatable drive shaft;
a motor coupleable to an end of a vehicle and operable to rotate the rotatable drive shaft;
a triangular crossing bar tube coupled to and extending horizontally from the rotatable drive shaft, the triangular crossing bar tube comprising lighting; and
a restraint coupleable to the end of the vehicle;
wherein the triangular crossing bar tube is deployable between a retracted position and a deployed position,
wherein the triangular crossing bar tube is substantially parallel to the end of the vehicle and is received within the restraint when in the retracted position, and
wherein the triangular crossing bar tube is substantially perpendicular to the end of the vehicle when in the deployed position.

19. The crossing bar system according to claim 18, wherein the lighting is activated when in the deployed position and de-activated when in the retracted position.

20. The crossing bar system according to claim 18, wherein the restraint comprises a protrusion operable to secure the triangular crossing bar tube in the retracted position, and wherein the motor is operable to deploy and retract the triangular crossing bar tube with a force sufficient to slide beyond the protrusion.

* * * * *